US010154679B2

(12) United States Patent
Slabbekoorn et al.

(10) Patent No.: US 10,154,679 B2
(45) Date of Patent: *Dec. 18, 2018

(54) PROTEIN CONCENTRATE AND AN AQUEOUS STREAM CONTAINING WATER-SOLUBLE CARBOHYDRATES

(71) Applicant: Cargill, Incorporated, Wayzata, MN (US)

(72) Inventors: Johannis Cornelis Slabbekoorn, Oostburg (NL); Johan Willy Gabriel De Meester, Antwerpen (BE); Jacobus Stephanus Vercouteren, Sas van Gent (NL); Cornelis Johannes Maria Schot, Bergen op Zoom (NL); Annemiek F. S. Van Cauteren, Bavel (NL); Rita Delrue, Mechelen (BE); Eugene J. Fox, Dayton, OH (US); Donald Lee Shandera, Jr., Blair, NE (US); Charles P. Anderson, Hereford, TX (US); Eric Bell, Blair, NE (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,504

(22) Filed: Jan. 9, 2015

(65) Prior Publication Data
US 2015/0118387 A1 Apr. 30, 2015

Related U.S. Application Data

(62) Division of application No. 10/587,883, filed as application No. PCT/US2005/003282 on Feb. 3, 2005, now Pat. No. 9,226,515.

(30) Foreign Application Priority Data

Feb. 3, 2004 (EP) .................................. 04250558

(51) Int. Cl.
A23J 1/12 (2006.01)
A23J 1/00 (2006.01)
A23J 1/16 (2006.01)
A23K 20/147 (2016.01)
A23K 50/10 (2016.01)
A23K 50/30 (2016.01)
A23K 50/75 (2016.01)
C08B 30/04 (2006.01)

(52) U.S. Cl.
CPC ............ *A23J 1/12* (2013.01); *A23J 1/005* (2013.01); *A23J 1/125* (2013.01); *A23J 1/16* (2013.01); *A23K 20/147* (2016.01); *A23K 50/10* (2016.05); *A23K 50/30* (2016.05); *A23K 50/75* (2016.05); *C08B 30/044* (2013.01); *C08B 30/046* (2013.01)

(58) Field of Classification Search
CPC ........ A23V 2002/00; A23V 2250/5488; A23V 2250/606; A23V 2250/628; A23V 2250/70; A23V 2200/332; A23V 2250/1578; A23V 2250/161; A23V 2250/1842; A23V 2250/264; A23V 2250/5028; A23V 2250/5036; A23V 2250/5086; A23V 2200/22; A23V 2200/3204; A23V 2300/16; A61K 2300/00; A61K 33/00; A61K 36/185; A61K 36/286; A61K 36/31; A61K 36/47; A61K 36/48; A61K 36/483; A61K 36/81; A61K 36/888; A61K 36/899; A61K 31/715; A61K 31/718; A61K 45/06; A61K 35/20; A23J 1/005; A23J 1/125; A23J 1/16; A23J 1/12; A23J 3/14; A23K 20/147; A23K 50/10; A23K 50/30; A23K 50/75; A23K 20/158; A23K 40/20; A23K 50/40; A23K 50/50; A23K 50/70; A23K 50/80; C05F 5/004; C05F 11/04; C08B 30/044; C08B 30/046; A23L 33/185; C05G 1/00; C05G 3/02; Y02A 40/818; Y02A 40/209; A01G 24/00; A01N 65/44
See application file for complete search history.

(56) References Cited

U.S. PATENT DOCUMENTS

| | | | |
|---|---|---|---|
| 3,081,171 A | 3/1963 | Reiners et al. | |
| 3,161,497 A | 12/1964 | Amburn | |
| 3,202,748 A | 8/1965 | Morio et al. | |
| 3,782,964 A | 1/1974 | Knight | |
| 3,840,515 A | 10/1974 | Reiners et al. | |
| 3,883,669 A | 5/1975 | Tsen et al. | |
| 3,928,631 A | 12/1975 | Freeman et al. | |
| 3,939,281 A | 2/1976 | Schwengers | |
| 4,042,714 A | 8/1977 | Torres | |
| 4,144,087 A | 3/1979 | Chwalek et al. | |
| 4,244,748 A | 1/1981 | Chwalek et al. | |
| 4,302,475 A | 11/1981 | Shigehiro | |
| 4,361,651 A | 11/1982 | Keim | |
| 4,622,226 A | 11/1986 | Ke et al. | |
| 4,659,576 A | 4/1987 | Dahle et al. | |
| 4,708,877 A | 11/1987 | Donovan et al. | |
| 4,735,808 A | 4/1988 | Scaglione et al. | |
| 4,849,244 A | 7/1989 | Zayas et al. | |

(Continued)

FOREIGN PATENT DOCUMENTS

| | | |
|---|---|---|
| CA | 1071923 A | 2/1980 |
| CN | 1302550 A | 7/2001 |

(Continued)

OTHER PUBLICATIONS

Baldwin et al., Edible Coatings for Lightly Processed Fruits and Vegetables, Hort Science, vol. 30(1), Feb. 1995, 35-38.

(Continued)

*Primary Examiner* — Deborah K Ware

(57) ABSTRACT

Disclosed are processes for contacting a protein containing material with one or more wet-mill streams. The protein content of the protein containing material is increased.

16 Claims, No Drawings

(56) References Cited

U.S. PATENT DOCUMENTS

| | | | |
|---|---|---|---|
| 4,904,486 | A | 2/1990 | Donovan et al. |
| 4,910,039 | A | 3/1990 | Fujita et al. |
| 4,914,029 | A | 4/1990 | Caransa et al. |
| 4,929,455 | A | 5/1990 | Connaughton, Jr. et al. |
| 4,960,705 | A | 10/1990 | Johann et al. |
| 4,978,544 | A | 12/1990 | Sexton |
| 5,019,403 | A * | 5/1991 | Krochta .............. A23B 4/10 426/100 |
| 5,021,248 | A | 6/1991 | Stark et al. |
| 5,030,268 | A | 7/1991 | Christians |
| 5,030,628 | A | 7/1991 | Joyeau et al. |
| 5,200,215 | A * | 4/1993 | Slade ................ A21D 8/042 426/18 |
| 5,198,035 | A | 5/1993 | Lee et al. |
| 5,254,673 | A | 10/1993 | Cook et al. |
| 5,290,749 | A | 3/1994 | Christians et al. |
| 5,290,757 | A | 3/1994 | Christians et al. |
| RE34,594 | E | 4/1994 | Christians |
| 5,362,511 | A | 11/1994 | Villagran et al. |
| 5,410,021 | A | 4/1995 | Kampen |
| 5,565,225 | A | 10/1996 | Johnston |
| 5,580,959 | A | 12/1996 | Cook et al. |
| 5,629,023 | A | 5/1997 | Bland |
| 5,712,107 | A | 1/1998 | Nichols |
| 5,730,969 | A | 3/1998 | Hora et al. |
| 5,759,223 | A | 6/1998 | Carlson et al. |
| 5,773,076 | A | 6/1998 | Liaw et al. |
| 5,858,423 | A | 1/1999 | Yajima et al. |
| 5,916,791 | A | 6/1999 | Hirschberg et al. |
| 5,922,379 | A | 6/1999 | Wang |
| 5,948,682 | A | 9/1999 | Moloney |
| 5,965,795 | A | 10/1999 | Hirschberg et al. |
| 5,968,585 | A | 10/1999 | Liaw et al. |
| 6,039,952 | A | 3/2000 | Sunvold et al. |
| 6,106,881 | A | 8/2000 | Yajima et al. |
| 6,169,217 | B1 | 1/2001 | Cheryan |
| 6,264,714 | B1 | 7/2001 | Gillette |
| 6,287,550 | B1 | 9/2001 | Trinh et al. |
| 6,320,101 | B1 | 11/2001 | Kaplan et al. |
| 6,383,776 | B1 | 5/2002 | Allen et al. |
| 6,399,123 | B1 | 6/2002 | Kerley et al. |
| 6,465,203 | B2 | 10/2002 | Nichols |
| 6,506,423 | B2 | 1/2003 | Drouillard et al. |
| 6,515,206 | B1 | 2/2003 | Chaudhuri et al. |
| 6,593,469 | B1 * | 7/2003 | Barresi ................ A01N 1/02 424/729 |
| 6,616,953 | B2 | 9/2003 | Fidler et al. |
| 7,303,778 | B2 | 12/2007 | McMindes et al. |
| 7,691,430 | B2 | 4/2010 | Marsland |
| 8,128,977 | B2 * | 3/2012 | Anfinsen ............ A21D 2/188 426/451 |
| 9,226,515 | B2 * | 1/2016 | Slabbekoorn ........... A23J 1/005 |
| 2002/0039612 | A1 | 4/2002 | Gambino et al. |
| 2002/0155206 | A1 | 10/2002 | Orlando |
| 2003/0044508 | A1 | 3/2003 | Ethington, Jr. |
| 2003/0070676 | A1 | 4/2003 | Cooper et al. |
| 2003/0083512 | A1 | 5/2003 | Jakel et al. |
| 2003/0113430 | A1 | 6/2003 | Ethington, Jr. |
| 2003/0125301 | A1 * | 7/2003 | Wolf ................. A61K 31/715 514/54 |
| 2003/0215417 | A1 | 11/2003 | Uchiyama et al. |
| 2005/0089602 | A1 | 4/2005 | Kvist et al. |
| 2005/0118326 | A1 * | 6/2005 | Anfinsen ............ A21D 2/181 426/658 |
| 2005/0208178 | A1 | 9/2005 | Bauer et al. |
| 2005/0220962 | A1 | 10/2005 | Xu et al. |
| 2006/0105098 | A1 | 5/2006 | Merrick |
| 2006/0204625 | A1 | 9/2006 | Woelfel |
| 2007/0172914 | A1 | 7/2007 | Slabbekoorn et al. |
| 2009/0053368 | A1 | 2/2009 | Fox et al. |
| 2009/0148589 | A1 | 6/2009 | Fox et al. |
| 2009/0209423 | A1 | 8/2009 | Slabbekoorn et al. |
| 2011/0038984 | A1 * | 2/2011 | Anfinsen ............ A21D 2/181 426/2 |
| 2014/0342038 | A1 | 11/2014 | Lewis et al. |

FOREIGN PATENT DOCUMENTS

| | | | |
|---|---|---|---|
| DE | 234786 | A1 | 4/1986 |
| DE | 4341283 | A1 | 7/1994 |
| DE | 4422658 | A1 | 1/1995 |
| DE | 19840489 | A1 | 3/2000 |
| EP | 0112459 | A1 | 7/1984 |
| EP | 0506233 | A2 | 9/1992 |
| EP | 0700884 | A1 | 3/1996 |
| EP | 0905518 | A1 | 3/1999 |
| EP | 0913097 | A1 | 5/1999 |
| EP | 1201137 | A1 | 5/2002 |
| EP | 0852910 | B1 | 8/2002 |
| GB | 1004343 | A | 9/1965 |
| GB | 1150827 | A | 5/1969 |
| GB | 2192003 | A | 12/1987 |
| JP | 52108092 | A | 9/1977 |
| JP | 52156941 | A | 12/1977 |
| JP | 55156592 | A | 12/1980 |
| JP | 55156593 | A | 12/1980 |
| JP | 56127675 | A | 10/1981 |
| JP | 57174066 | A | 10/1982 |
| JP | 58129942 | A | 8/1983 |
| JP | 59175891 | A | 10/1984 |
| JP | 59204114 | A | 11/1984 |
| JP | 2265445 | A | 10/1990 |
| JP | 03050292 | A | 3/1991 |
| JP | 05176781 | A | 7/1993 |
| JP | 5222097 | A | 8/1993 |
| JP | 05268954 | A | 10/1993 |
| JP | 05331072 | A | 12/1993 |
| JP | 06181725 | A | 7/1994 |
| JP | 06279483 | A | 10/1994 |
| JP | 08048895 | A | 2/1996 |
| JP | 08066179 | A | 3/1996 |
| JP | 09132595 | A | 5/1997 |
| RO | 109221 | B1 | 12/1994 |
| SU | 562570 | A | 7/1977 |
| SU | 1546022 | A | 2/1990 |
| SU | 1551318 | A | 3/1990 |
| WO | 1990/05453 | A | 5/1990 |
| WO | 1992/05708 | A | 4/1992 |
| WO | 1993/08274 | A1 | 4/1993 |
| WO | 1993/08682 | A1 | 5/1993 |
| WO | 1993/12667 | | 7/1993 |
| WO | 1994/20628 | A2 | 9/1994 |
| WO | 1995/13997 | A1 | 5/1995 |
| WO | 1996/02594 | A2 | 2/1996 |
| WO | 1996/40607 | A1 | 12/1996 |
| WO | 1997/01614 | A1 | 1/1997 |
| WO | 1997/23436 | A1 | 7/1997 |
| WO | 1998/02563 | A1 | 1/1998 |
| WO | 1998/23567 | A1 | 6/1998 |
| WO | 1999/14351 | A1 | 3/1999 |
| WO | 1999/17738 | A1 | 4/1999 |
| WO | 1999/31982 | A1 | 7/1999 |
| WO | 1999/34810 | A1 | 7/1999 |
| WO | 1999/34916 | A1 | 7/1999 |
| WO | 1999/40209 | A1 | 8/1999 |
| WO | 1999/51758 | A1 | 10/1999 |
| WO | 2000/006141 | A1 | 2/2000 |
| WO | 2000/011177 | A1 | 3/2000 |
| WO | 2000/012681 | A1 | 3/2000 |
| WO | 2000/018365 | A1 | 4/2000 |
| WO | 2000/20569 | A1 | 4/2000 |
| WO | 2000/028057 | A2 | 5/2000 |
| WO | 2000/040738 | A1 | 7/2000 |
| WO | 2000/049157 | A2 | 8/2000 |
| WO | 2000/052169 | A1 | 9/2000 |
| WO | 2000/052171 | A1 | 9/2000 |
| WO | 2000/052172 | A1 | 9/2000 |
| WO | 2000/063401 | A1 | 10/2000 |
| WO | 00/69276 | A1 | 11/2000 |
| WO | 2000/070016 | A2 | 11/2000 |
| WO | 2001/017373 | A1 | 3/2001 |
| WO | 2001/019383 | A1 | 3/2001 |

(56) References Cited

FOREIGN PATENT DOCUMENTS

| | | |
|---|---|---|
| WO | 2001/037681 A1 | 5/2001 |
| WO | 2001/045517 A1 | 6/2001 |
| WO | 2001/049852 A1 | 7/2001 |
| WO | 2001/068870 A2 | 9/2001 |
| WO | 2001/070194 A1 | 9/2001 |
| WO | 2001/076391 A1 | 10/2001 |
| WO | 2001/78521 A2 | 10/2001 |
| WO | 2001/090389 A2 | 11/2001 |
| WO | 2001/098474 A1 | 12/2001 |
| WO | 2002/000890 A1 | 1/2002 |
| WO | 2002/013624 A1 | 2/2002 |
| WO | 2002/013806 A2 | 2/2002 |
| WO | 2002/013811 A2 | 2/2002 |
| WO | 2002/014459 A2 | 2/2002 |
| WO | 02/37980 A2 | 5/2002 |
| WO | 2002/29077 A3 | 5/2002 |
| WO | 2002/34700 A1 | 5/2002 |
| WO | 2002/228196 A3 | 6/2002 |
| WO | 02/052948 A2 | 7/2002 |
| WO | 02/054885 A1 | 7/2002 |
| WO | 02/063975 A2 | 8/2002 |
| WO | 2002/62154 A1 | 8/2002 |
| WO | 2002/67698 A1 | 9/2002 |
| WO | 2002/76188 A3 | 10/2002 |
| WO | 03/016441 A1 | 2/2003 |
| WO | 2003/15502 A1 | 2/2003 |
| WO | 2004/011850 A1 | 2/2004 |
| WO | 2004/016097 A1 | 2/2004 |
| WO | 2004/103086 A2 | 12/2004 |
| WO | 2005/74704 A1 | 8/2005 |
| WO | 2007/19176 A2 | 2/2007 |
| WO | 2007/19178 A2 | 2/2007 |
| WO | 2007/19227 A1 | 2/2007 |
| WO | 2010/068990 A1 | 6/2010 |
| WO | 2013/096369 A1 | 6/2013 |

OTHER PUBLICATIONS

"Preparation of edible proteins from the by-products of corn wet milling (CPC International)", Research disclosure, Mason Publications, Hampshire, GB, vol. 185, No. 19, Sep. 1979 (Sep. 1979), XP007106760, ISSN: 0374-4353.
Gluten is good for all, Ukrainian Times {Jan. 25, 2000); Abstract.
"Membranes Boost Corn Wet-Milling", High Tech Separations Industry Review, Business Communications Company, Incorporated, (2001): p. 12-13.
"Advanced Filtration Membranes Boost Corn Wet-Milling", High Tech Separation News 13(1) (2000).
Peter, C.M., et al., "The effects of corn milling coproducts on growth performance and diet digestibility by beef cattle", J. Anim. Sci. 78 (2000): p. 1-6.
Phelps, A., "Corn gluten feed mineral supplement launched in Britain", Feedstuffs (1991): p. 17.
Belibasakis, N.G. et al., "Effects of Dry Corn Gluten Feed on Milk-Production and Blood Components of Dairy-Cows", Zivocisna Vyroba 41(3) (1996), p. 111-114.
Schroeder, J.W. et al., "Wet Corn Gluten Feed Fed Fresh or Stored and Supplemented with Rumen Undegradable Protein in the Diets of Lactating Dairy Cows", Professional Animal Scientist 21 (2005), p. 254-262.
Supplementary European Search Report of EP06789201, dated Oct. 6, 2011. 2 pages.
Helbig NB et al. "Debittering of Skim Milk Hydrolysates by Adsorption for Into Acidic Beverages", Journal of Food Science, 45(2):331-335, 1980.
Cornell University. "Studying Proteins and Protein Purification." Archived Feb. 23, 2001. 8 pages.
EnerGenetics International, Inc, "Overview" and "Corn Protein Isolate."Archieved Nov. 22, 2003. 2 pages.
"Myers et al. ""Functional Properties of Protein Extracted from Flaked, Defatted, Whole Corn by Ethanol/Alkali During SequintialExtraction Processing."" JAOCS. vol. 71, No. 11. Nov. 1994."
NutriStrategy. "Calories from Fat, Protein, Carbohydrates, Alcohol." 2010.
Weigle et al., "A high-protein diet induces sustained reductions in appetite, ad libitum caloric intake, and body weight despite compensatory changes in diurnal plasma leptin and ghrelin concentrations," AM.J.Clin. Nutr., 2005, 82:41-48.
Gray et al., "Purification and Characterization of a Peroxidase from Corn Steep Water", J. Agric. Food Chem., 2003, 51 (6), pp. 1592-1601.
Anonymous, "Method for decomposition of polysaccharides, preferably plant cell wall polysaccharides, by means of a carbohydrase", (HS Olsen, Novo Industri A/S), Derwent—RD, RD217038, May 10, 1982.
PCT International Search Report PCT/US2005/0038282 dated May 7, 2005, 2 pages.
PCT International Search Report PCT/US2006/030114 dated Mar. 4, 2008. 2 pages.
PCT International Search Report PCT/US2006/030266 dated Jul. 12, 2006. 2 pages.
PCT International Search Report PCT/US2006/030106 dated May 15, 2008, 2 pages.
Derwent abstract No. 1996-434161, an abstract of ZA 9508754.
Derwent abstract No. 1977-08624Y, an abstract of JP 58043062B.
"Astrup, ""The satiating power of protein—a key to obesity prevention?"" Am. J. Clin. Nutr., 2005,82(1):1-2".
CHEMaster International Inc. "Product Catalog: Zein, Corn Protein, Prolamine Protein" 2011.
Amendment and Response for U.S. Appl. No. 11/997,820, filed Jun. 1, 2016 (9 pages).
Amendment & Response to Non-Final Office Action for U.S. Appl. No. 11/996,710, filed Apr. 12, 2016 (9 pages).
Response to Final Office Action for U.S. Appl. No. 11/997,8720, filed Feb. 2, 2016 (8 pages).
Amendment & Response for U.S. Appl. No. 11/997,820, filed Aug. 19, 2015.

* cited by examiner

PROTEIN CONCENTRATE AND AN AQUEOUS STREAM CONTAINING WATER-SOLUBLE CARBOHYDRATES

CROSS-REFERENCE TO RELATED APPLICATIONS

This application is divisional patent application of U.S. application Ser. No. 10/587,883, which is incorporated herein by reference in its entirety and is a national stage application under 35 U.S.C 371 of International Application No. PCT/US2005/003282, which was filed on Feb. 3, 2005, which in turn claims priority to European Application No. 04250558.6, which was filed on Feb. 3, 2004.

FIELD OF THE INVENTION

Disclosed herein are protein concentrates and streams containing water-soluble carbohydrates (co-products) and methods of preparing them.

BACKGROUND

For over 100 years corn wet milling has been used to separate corn kernels into products such as starch, protein, fiber and oil. Corn wet milling is a two stage process: (a) a steeping process to soften the corn kernel and to facilitate the next step; (b) a wet milling process resulting in purified starch and different co-products such as oil, fiber, and protein. In general, starch recoveries are between 90 to 96%. The remainder of the starch is found in the different co-products.

US patent 2003/0070673 to Liaw et al., U.S. Pat. Nos. 4,144,087 and 4,244,748 to Chwalek et al., EP patent 0 506 233 to Chie-Ying, U.S. Pat. No. 3,928,631 to Freeman et al., U.S. Pat. No. 4,960,705 to Johann et al., Patent WO 93/12667 to Cook et al., U.S. Pat. No. 4,361,651 to Keim, WO patent 02/067698 to Kvist et al., U.S. Pat. Nos. 5,773,076 and 5,968,585 to Liaw et al. relate to wet-milling processes that produce various products.

SUMMARY

The disclosed process provides methods of making streams containing water-soluble carbohydrates and protein concentrates.

In some embodiments these methods involve contacting a stream that has previously been used in a wet-milling process (wet-mill stream) with protein-containing material that has also been obtained from a wet-milling process. These two components are then additionally contacted with carbohydrate hydrolyzing enzymes (carbohydrases) that break-down the starch and/or non-starch complex carbohydrates, such as fiber, into water soluble carbohydrates. The resulting protein concentrate is then separated from the aqueous stream, thus resulting in two products an aqueous stream that has an increased level of water-soluble carbohydrates (increased meaning greater than prior to contact with the protein-containing material and the hydrolyzing enzymes) and protein concentrate that has an increased protein concentration (increased meaning greater than prior to contacting the wet-mill stream and the carbohydrases).

In other embodiments, a protein concentrate and an aqueous stream containing water-soluble carbohydrates can be made from grain by contacting one or more protein containing materials with one or more wet-mill streams and one or more carbohydrases and then separating the resulting protein concentrate from the resulting aqueous stream containing water-soluble carbohydrates. The separation can be accomplished using any method known in the art for example membrane separation, centrifugation, floatation, and the like. The separation can optionally be accomplished at higher temperatures, such as greater than 45° C., 50° C., 60° C., 80° C., or 100° C. In another embodiment, a membrane filtration is performed before or after the separation of the protein concentrate and the aqueous stream. The protein concentration of the protein concentrate can be further increased by defatting the protein containing material. Defatting can be accomplished by contacting the protein-containing material with a solvent and/or an enzyme.

In some embodiments the protein-containing material comprises gluten, and in yet other embodiments the protein-containing material can be bleached using enzymes and/or chemicals.

As mentioned below, the wet-mill stream can be steep liquor, light steep water, heavy steep liquor, primary feed, any centrifuge or hydrocyclone overflow, a washing or dewatering filtrate, or mixtures thereof. Examples of centrifuge overflows include mill stream thickener overflow, primary overflow, clarifier overflow, starch wash overflow, or mixtures thereof. Examples of hydrocyclone overflows include starch wash overflow and millstream thickener. Examples of washing and dewatering streams include gluten filtrate and fiberwash filtrate.

In some embodiments the process includes recycling the aqueous stream containing water-soluble carbohydrates. In other words, contacting the aqueous stream containing water-soluble carbohydrates with the protein-containing material and the carbohydrases and then separating the aqueous stream containing water soluble carbohydrates from the protein concentrate.

In some embodiments protein-containing material used in the processes described herein can be the light gluten fraction, heavy gluten fraction, corn gluten concentrate, corn gluten meal, gluten cake and mixture thereof.

In other embodiments, methods involve a process step that comprises a filtration step to remove low protein content components. Optionally, a washing step can be used during or after filtration to increase protein content of the resulting protein concentrate.

In yet other embodiments the carbohydrases can be reacted with the protein-containing material and the wet-mill stream at temperatures that are at least room temperature, at least 40° C., at least 50° C., at least 70° C., at least 90° C., at least 100° C., or at least 120° C.

The resulting protein concentrate and/or the aqueous stream containing water-soluble carbohydrates can be dried. The aqueous stream containing water-soluble carbohydrates can be dried to greater than 20%, greater than 40%, greater than 60%, greater than 70%, or greater than 80% dry solids.

The current invention further relates to a process for increasing recovery of proteins in one or more protein containing materials of grain wet milling process and characterized in that in said process the content of water-soluble carbohydrates is increased in at least one aqueous stream containing water-soluble carbohydrates.

Furthermore, it relates to a process comprising the following steps:
a. Taking a protein containing material obtainable after at least one separation step in the wet-milling process,
b. Contacting an aqueous stream of said wet-milling process with the protein containing material, c. Adding an effective amount of carbohydrase for converting starchy material in said protein containing material into water-soluble carbohydrates, d. Separating in two streams, preferably a protein concentrate and an aqueous stream enriched with water soluble carbohydrates.

Another aspect of the invention provides compositions having corn protein concentrate without exogenous amino acid sequences from saccharification enzymes. Saccharification enzymes are enzymes that produce short DP dextrose. Usually, saccharification is used to facilitate the production of feedstock for fermentation. Examples of saccharification enzymes include glucoamylases (glucosidase), pullulanases and mixtures thereof. Exogenous as used herein refers to enzymes that are added to the process either in host cells or as isolated enzymes. Accordingly, the invention also provides methods of making such compositions wherein these methods involve not carrying out a saccharification step. The presence of exogenous saccharification enzyme amino acid sequences can be detected by any method known in the art, such as ELISA, electrophoresis, amino acid sequencing and/or activity assays. The saccharification enzymes can be derived from microorganisms, such as for example fungus and/or bacteria.

Another aspect of the invention provides compositions comprising greater than 70%, 80%, or 90% corn protein concentrate and a carbohydrate profile wherein at least 10% of the DP 1-13 sugars are DP 5-13 (methodology provided below). Accordingly, compositions wherein at least 20%, 30%, 35%, 40%, and 55% of the DP 1-13 sugars are DP 5-13 are also provided. The DP 1-13 sugars are alpha 1-4 linked dextrose.

DETAILED DESCRIPTION

I. Methods of Making Products

The disclosed process can be used to make a protein concentrate from any grain that is wet milled, for example, corn, wheat, barley, malt, or sorghum (millet).

a. Wet-Milling

Wet-milling grain involves soaking the grain. In the corn wet-milling process the soaking of the grain is termed "steeping." The steeping process of corn, generally, includes the addition of sulfur dioxide (from about 0.1 to about 0.3%) and steeping times of from about 24 to about 48 hours at temperatures between from about 45 to about 60° C. After steeping, light steep water is obtained, which contains a high percentage of the soluble parts from the corn kernels. The resulting steeped corn kernels are relatively softer than they were prior to steeping and at the end of the steeping process they can be separated into germs, fiber, starch and proteins.

The steeped corn is course ground in two steps to release the germ from the kernels. The germs are separated after each coarse milling step. Germs have an oil content of approximately 45-55%. The oil is usually extracted in subsequent refining steps.

The remaining coarse de-germed kernels are milled for the third time to disrupt the endosperm matrix and release the starch. Fibers are removed from the starch and endosperm proteins by passing the slurry over a series of screens.

The separated fiber is then dewatered and dried. In some instances the fiber is combined with steep water that has been concentrated in evaporators until it reaches about 45 to about 50% dry solids. The dried mixture of fiber and steepwater is referred to as corn gluten feed.

The remaining starch protein mixture is thickened and separated using a series of centrifuges. In the mill stream thickener (MST) centrifuge, the feed density is increased to improve separation of starch and endosperm protein (gluten). The overflow from the MST is sent to the steep house for use as steep water. The underflow from the MST is sent to the primary centrifuge (primary separation step). In the primary separation step the gluten proteins are partially separated from the starch. The overflow from the primary centrifugation step is the light gluten stream. The primary underflow is sent to starch washing to purify the starch. Overflow from the starch wash step is thickened in the clarifying centrifuge. The clarifier underflow is returned to the primary centrifuge feed tank. The clarifier overflow is used for primary centrifuge wash water and fiber wash water.

The light gluten stream, containing about 5% dry solids, is concentrated in the gluten thickener centrifuge. The overflow is used for fiber and germ washing. The underflow, referred to as heavy gluten contains from about 10 to about 20% of dry substance, mainly insoluble proteins (less than about 70% on dry base) and from about 10 to about 25% of starch (on dry base). The suspended solids in the heavy gluten are separated from the process water with rotary vacuum filters. The gluten cake that discharges from the filters contains about 55 to about 65% water. The process water (sometimes referred to as gluten filtrate) that was separated from the gluten cake is returned to the gluten thickener feed tank. The gluten cake is dried to a moisture content of less than about 12%, and is referred to as corn gluten meal.

One of ordinary skill in the art will appreciate that description provided herein is of an exemplary wet-milling process and that the process can be varied considerably from the above description. Therefore, it is understood that any method of separating the starch, protein, and fiber into separate streams can be used to provide the starting materials needed for the disclosed methods.

b. Starting Materials

The process of producing a corn protein concentrate can start using any corn-protein-containing material that is produced during the wet-milling process. The term "corn gluten" as used herein refers to water insoluble proteins derived from endosperm. The term "corn protein containing material" refers to streams generated from the wet-milling process wherein greater than 2% of the solids are gluten, and less than one quarter of the original kernel fiber and germ. For example, corn-protein-containing material includes streams such as heavy gluten, gluten cake, starch wash overflow, and primary feed. One or more of these corn-protein-containing materials can be used in the process.

The wet-mill stream is a flowable stream that has previously been used in the wet-milling process. Exemplary wet-mill streams include corn steep liquor (CSL), which can be either heavy (evaporated CSL) or light (LSW), primary feed, any centrifuge or hydrocyclone overflow, a washing or dewatering filtrate, or mixtures thereof preferred examples of centrifuge overflows include mill stream thickener overflow, primary overflow, clarifier overflow, starch wash overflow, or mixtures thereof preferred examples of hydrocyclone overflows include starch wash overflow and millstream thickener. Examples of washing and dewatering streams include gluten filtrate and fiberwash filtrate. These streams are characterized in that they have at least trace amounts of protein and carbohydrates from corn.

The carbohydrases used can be any enzyme that can facilitate the degradation (such as either saccharification and/or liquefaction) of a complex carbohydrate to a water-soluble carbohydrate. For example, enzymes such as alpha-amylases, glucoamylases, dextrinases, pullulanases, hemicellulases, and cellulases or mixtures can be used. Alpha-amylase can be used to liquefy starch (liquefaction) up to about a 40 dextrose equivalent (DE) sweetness measure. Mixtures of glucoamylase and pullulanase can be further used in a saccharification step after liquefaction to further degrade the starch polymers up to about 95-97 DE, which contain greater than 90% of the total sugars (DP 1-14) with a composition of at least 90% sugars of DP 1-4. In some embodiments the methods involve liquefaction without saccharification. In these embodiments the enzymes used will be those commonly used to hydrolyze starch molecules such as alpha-amylases. In some embodiments the methods involve contacting the material with hemicelluloses and celluloses in combination with liquefaction and optionally saccharification. Malted grain and parts thereof may also be used as a source of enzyme.

In some embodiments the protein content of the protein concentrate can be altered by using additional enzymes. For example, phytases and or pectinases can be used to digest the pectin and/or the phytate, which will allow them to be separated from the protein concentrate. Use of phytases and pectinases may also result in a protein concentrate that is more digestible than a concentrate that has not been treated. Other enzymes that may be used are enzymes that join protein fragments, for example polyphenoloxidases and/or transglutaminases. In some applications elongated proteins will be more desirable. These enzymes can be introduced simultaneously with the carbohydrases or they can be added in a separate step.

b. Processing

One or more of the corn protein containing materials is contacted with one or more wet-mill streams and one or more carbohydrases. The corn protein containing material, wet mill-stream and carbohydrases can be placed in contact with each other using any method known in the art, such as by slurring, mixing, or blending. In some embodiments, methods involve a process step that comprises a filtration step to remove low protein content components.

The composition containing the carbohydrases eventually supplemented with additional enzymes, wet-mill stream, and corn-protein-containing material is incubated at a time and temperature sufficient to at least degrade the starch and/or other complex carbohydrates present in the corn-protein-containing material and/or the wet-mill stream to the point where upon separation of the aqueous stream containing water soluble carbohydrates from the resulting corn protein concentrate, the aqueous stream has a higher concentration of water soluble carbohydrates then the wet-mill stream had prior to contacting the carbohydrases.

Exemplary temperatures that can be used to incubate the mixture containing the carbohydrases, wet-mill stream, and corn-protein-containing material include from about 30 to about 250° F. (15-120° C.), and exemplary incubation times include from about ½ hours to about 40 hrs. The incubation temperature and time depend on the starting materials, enzymes, and the amount of enzymes used.

Separating the protein concentrate from the aqueous stream can be accomplished by any method known in the art. For example, filtration, centrifugation, coagulation, and combinations thereof can be used.

It is also possible to increase the concentration of water-soluble carbohydrates in the aqueous stream by recycling, or reusing, the aqueous stream as one of the wet-mill streams used in the process.

The protein concentration of the resulting protein concentrate can additionally be increased by rinsing the resulting concentrate with water, and/or a wet-mill stream. The rinsing washes away residual carbohydrates and increases the protein concentration on a dry basis. Using this technique the protein concentration can be increased by at least 2, 5, 7, 10 or 20% on a dry basis.

Yet another way of increasing the concentration of protein in the protein concentrate is to remove fats from the concentrate (defatting). Defatting can be accomplished using any method known in the art, for instance by using one or more solvents and/or degrading the fats with enzymes. Examples of solvents that can be used include hexane, isohexane, alcohols and mixtures thereof. Examples of enzymes that can be used include lipases and the like. The fats can subsequently be separated from the protein concentrate using any method known in the art, for example filtration, floatation, and/or centrifugation.

Additionally, the protein concentrate can be decolorized by bleaching using either chemical and/or enzymatic methods. Enzymes that can be used to facilitate bleaching include those having lipoxygenase (LOX) activity, and peroxidase activity. Chemicals that can be used alone or in combination with enzymes to facilitate bleaching include ozone, persulfate and peroxides. The filtration of the protein concentrate can be accomplished while the stream containing the protein is at temperatures of, for example, greater than 45° C., 50° C., 55° C., 60° C., 65° C., 80° C., or 100° C. This provides the advantage of being able to control microbial growth and mycotoxin concentration during the filtration process. The ability to use increased temperatures also allows enzyme activity to be modulated.

II. Uses of the Products

The resulting aqueous stream containing water-soluble carbohydrates and/or the protein concentrate can be used as the sole carbon and nitrogen source for various fermentations or it can be blended with other carbon sources to provide a cost efficient fermentation.

In some embodiments, the aqueous stream containing water-soluble carbohydrates can be concentrated to dry substance levels of about 60% and higher.

The products produced can also be used in feed applications for hogs in a liquid form or for cattle and poultry in a dried form.

The protein concentrate can be used in various animal feeds (including but not limited to farm animals, companion animals, fish, humans, and exotic animals) for improving the digestibility. The concentration of protein in the protein concentrate allows for the delivery of a desired amount of protein without having to deliver a large volume of material. This lessens the amount of waste produced by the animal and can contribute to digestibility improvement.

The protein concentrate can also be used as a food texturizer and flavor modulator in products that will be consumed by humans.

Additional features and advantages of the invention will be described in and apparent from the examples provided below.

EXAMPLES

Analytical Procedures:

Dry solids were determined by drying of the material at 103° C. using a method adapted from Dutch standard method NEN 3332 and according to the official method AACC 44-15A of the American Association of Cereal Chemists.

Total and soluble protein content were determined according AACC method 46-30 using the Dumas method by combustion of a sample at a minimal temperature of 900° C. in pure oxygen and determination of nitrogen using a thermal conductivity detector. For nitrogen to soluble or total protein conversion factor of 6.25 was used.

Starch content was determined by a method derived from AACC 76-13 and the Megazyme kit method for starch. Samples were washed with ethanol to remove sugars. Solubilization of starch is achieved by cooking the sample in the presence of thermo stable ?-amylase followed by amyloglucosidase. The glucose formed is measured using glucose oxidase/peroxidase reagent and measurement of the absorbance.

Total starch carbohydrates are determined by the previous method but washing of sugars with ethanol is skipped. The difference between total starch carbohydrates and starch content results in the amount of soluble sugars.

Sugars in Examples 1-9 were determined using a method derived from AACC 80-05. The sugar content of the mill streams and the collected filtrate was determined by filtering each liquid fraction through a 0.45 micron Whatman syringe filter and injecting the liquid into an HPLC system consisting of an Aminex HPX-87H ion exclusion column (Bio-Rad, Hercules, Calif.) with a 0.01N sulfuric acid mobile phase eluded at 0.6 ml/min and a Waters model 410 Refractive index detector (Waters Corporation, Milford, Mass., USA). Analysis of the obtained information was made using Waters Millenium software. The sugar content was determined as the sum of the quantitation of glucose, fructose, maltose and maltotriose sugars standardized against the column.

Sugar DP profile and quantitation for Example 14 was based on using a method derived from AACC 80-05. The water extractables were analyzed by first precipitating protein with sulfosalicylic acid and then ion exchanging with anion and cation resin, then by filtering each liquid fraction through a 0.45 micron Whatman syringe filter, and injecting the liquid into an HPLC system consisting of an silver ion exchange column with water as mobile phase and a refractive index detector. Analysis of the obtained information was made as the sum of the eluded peaks less than the degree of glucose polymerization (DP) of 14 standardized against the column. The peak area sum % of sugars of DP 1-4 in comparison to DP 5-13 as compared to the totaled sum of peaks 1-13 were compared.

Total or crude lipid content is determined using a method derived from AACC 30-24, 30-20, 30-25 and EEC method L25/29 using a Soxtec extraction instrument. A thimble containing a sample is immersed directly into boiling petroleum-ether. The thimble is moved above the solvent to the rinse-extraction step. Finally, after evaporation of the solvent, the residue is weighted and the lipid content is calculated.

Organic acid content is determined by HPLC method using UV detection.

Ash is determined using a method derived from AACC 08-01 by wet-ashing of a sample at 900° C.

Phytate is determined in the sample by extraction of phytic acid and purification using different techniques and analyzed quantitatively by HPLC using conductivity.

Example 1. Gluten Cake with Light Steep Water (Lab Procedure)

Experimental Procedures:

Heavy gluten slurry (HGS) and light steep water draw off (LSW) were collected from two different European Cerestar corn wet milling facilities (further referred to as CWM 1 and CWM 2). Dewatered corn gluten cake (CG cake) was obtained by filtrating heavy gluten slurry over a Buchner filter or were collected directly from these corn wet milling facilities. Heavy gluten slurry contains solubles that were reduced by this filtration step. The proximate composition of the mill streams is listed in Table 1-1.

TABLE 1-1

Proximate composition of mill streams used.

| Mill Stream | Dry solids (%) | Protein (% db) | Starch (% db) | Sugars (% db) |
|---|---|---|---|---|
| HGS CWM 1 | 15.7 | 60.7 | 20.8 | 4.5 |
| CG cake CWM 1 | 34.1 | 63.3 | 20.9 | 1.5 |
| CG cake CWM 2 | 41.1 | 68.0 | 11.4 | 2.9 |
| LSW CWM 1 | 10.5 | 43.7 | 1.7 | 6.8 |
| LSW CWM 2 | 10.8 | 41.1 | 3.9 | 8.2 |

The dewatered corn gluten cake was mixed with light steep water (LSW) in ratio of 1:3, 1:4, 1:5, 1:6, 1:7, and 1:8 (CG cake: LSW). Generally, as the dry solid content increases the reaction times should be increased to get sufficient destarching.

For clarity, the following description of the process is provided as it was used for a sample having a ratio of 1:6 (CG cake:LSW). A mixture of 1800 mL of freshly taken light corn steep water (dry solids content 10.5-10.8%) and 300 g of dewatered corn gluten cake (35-40% of dry solids—see Table 1-1 for appropriate number) was stirred for 30 minutes at 50° C. At the end of this period the pH was adjusted with 10% (m/m) sodium hydroxide to pH 5.8-6.2.

Liquefaction of the starch was achieved by adding 0.1% of thermostable ?-amylase (e.g. Termamyl™, Novozymes A/S, DK-2880 Bagsvaerd, Denmark) on dry matter basis to the slurry and heating at 95° C. for 15 minutes. The slurry was cooled to 60° C. and adjusting the pH to 4.7 with 10% (m/m) hydrochloric acid, 0.1% of gluco-amylase (e.g. Glucostar 300 L, Dyadic International Inc., Jupiter, Fla., USA) on dry base added and incubation was continued for at least two hours.

In one case, also 300 mg of phytase (Finase, AB Enzymes, Darmstadt, Germany) was added to the slurry and the temperature was then kept at 50° C. for 2 hours. It was convenient to do this step at the same time as the addition of gluco-amylase.

Then the mixture was filtered on a Buchner funnel under vacuum using a Wattman 91 [Whatman PLC, Maidstone, Kent, UK] filter resulting in a gluten cake and a filtrate. The gluten cake was dried at 80° C. during 20 minutes. The filtrate was evaporated on a rotary vacuum drier at 40° C. and could easily be concentrated to a dry solid content of about 70%.

The results of the composition of the products are summarized in Table 1.2.

TABLE 1.2

Results of corn gluten concentrate and filtrate of two different corn wet mills (ratio 1:6) (All numbers on dry base)

| | Corn gluten concentrate | | Filtrate | |
|---|---|---|---|---|
| Component | CWM 1 | CWM 2 | CWM 1 | CWM 2 |
| Starch | 0.5 | 2 | 0.5 | 0.5 |
| Total protein | 68 | 75 | 30 | 35 |
| Lipids | 5 | 4 | n.d. | n.d. |

TABLE 1.2-continued

Results of corn gluten concentrate and filtrate of two different corn wet mills (ratio 1:6) (All numbers on dry base)

| Component | Corn gluten concentrate | | Filtrate | |
| --- | --- | --- | --- | --- |
| | CWM 1 | CWM 2 | CWM 1 | CWM 2 |
| Sugars | 3 | 3 | 15 | 30 |
| Phytate | 1 | 1 | 3 | 3 |
| Organic acids | 9 | 4 | 30 | 18 |
| Crude fiber | 10 | 8 | n.d. | n.d. |
| Ash | 3.5 | 3 | 22 | 11 |

Results/Discussion:

Dewatering heavy gluten slurry results in a gluten cake containing a higher protein content. After liquefaction and saccharification the cake consisting of the corn gluten concentrate has a higher dry solid content (40-45% range) compared to the starting CG cake (35-40%). Differences in the composition of LSW and CG cake also results in somewhat different composition of both the protein concentrates and filtrate. Compared to the evaporation of steep water, these filtrates can be easily evaporated to a higher dry solid content to 60-70%. This is much higher then with heavy corn steep liquor that usually can be concentrated in the range of 45 to 50% of dry solids. Composition of these filtrates is different compared to steep water: less proteins (30-35%) and more sugars (15 to 30%) depending on the composition of the starting LSW (40% proteins and up to 15% sugars).

Example 2. Enzymatic Bleaching of Heavy Gluten Slurry

Experimental Procedures:

In these experiments untoasted full fat soy flour (Provaflor) from Cargill, Ghent (Belgium) containing active lipoxygenase (LOX) was added at different levels to heavy gluten slurry (HGS).

Bleaching of xanthophylls in HGS was carried out at room temperature. A portion of 75 g heavy gluten slurry was weighed into a 200 ml beaker. Water was added (10 ml) to dilute the slurry and the pH was adjusted to 6.5 by adding dropwise 1.0 M NaOH. Then soy flour was added at 5 and 15% levels for heavy gluten (w/w, db) and the mixture was incubated for 1 hour at 40° C. During incubation the slurry was stirred at 2000 rpm using a magnetic stirrer with a stirrer bar and air was passed continuously through the slurry using an aquarium and pond air pump. Upon completion of the reaction, the pH of the slurry was immediately readjusted below 2.5 by adding 1.0 M HCl to stop enzyme activity. Finally, the samples were lyophilized and analyzed for xanthophylls using a spectrophotometric method.

TABLE 2-1

Results of xanthophylls level using full fat soy flour.

| Product | HGS freeze dried | 5% soy flour | 15% soy flour |
| --- | --- | --- | --- |
| Xanthophylls content (ppm) | 162 | 63 | 40 |
| Colour level compared to freeze dried HGS | 100% | 38% | 25% |

Results/Discussion:

At an addition level of 5% soy flour (w/w, db) 62% of xanthophylls in the heavy gluten slurry were bleached whereas 75% were bleached at a substitution level of 15% soy flour (calculated against the freeze dried starting material).

For those skilled in the art it is clear that the same procedure can be used starting from the dewatered gluten cake and that LSW, millstream, or demi-water needs to be added then to have a slurry that can be oxygenated in an appropriate way.

Example 3. Enzymatic Bleaching of Heavy Gluten Slurry

Experimental Procedures:

Heavy gluten slurry (HGS) was collected from two different Cerestar corn milling facilities (further referred to as CWM1 and CWM2). The same procedure can be applied on CG cake but for convenience of trials heavy gluten slurry was used. The proximate composition of the heavy gluten slurry is listed in Table 3-1.

TABLE 3-1

Proximate composition of heavy gluten slurry used.

| Plant | Dry solids (%) | Protein (% db) | Starch (% db) | Crude lipids (% db) | Xanthophylls (ppm) |
| --- | --- | --- | --- | --- | --- |
| CWM 1 | 15.7 | 60.7 | 20.8 | 6.7 | 215 |
| CWM 2 | 12.2 | 60.4 | 12.5 | 8.4 | 217 |

Heavy gluten slurry was adjusted to pH between 5.8 to 6.2 and 0.1% of thermostable ?-amylase (e.g. Termamyl 120 L from Novozymes A/S, DK-2880 Bagsvaerd, Denmark)) was added on dry matter base at ambient temperature. This mixture was pumped at a flow rate of 80 L/h through the liquefaction unit with a steam injector operating at steam pressure of 7.5 bar. Product pressure was 10 bar at 100° C. and mixture had a holding time of 15 minutes (back pressure of 1 bar).

Bleaching is preferentially conducted before liquefaction. After cooling to ambient temperature the pH of the mixture was adjusted to about 6.5 to 7. Freshly produced full fat soy flour (Provaflor, Cargill Ghent) was added to the heavy gluten in a 5% amount based on the dry matter of the heavy gluten. Bleaching was conducted in a Belginox reactor with water heater and circulation in 300 kg batches. Conditions were as follows: stirring at 50 rpm, temperature 40° C. and air bubbling at 3 bar pressure rate during at least one hour. It was found out that increasing the time of bubbling had an improved bleaching result.

The liquefact was collected in a 600-liter tank and cooled to about 60° C. The pH was adjusted between 4.6 and 4.8 and 0.1% of gluco-amylase (e.g. Glucostar 300 L from Dyadic International Inc., Jupiter, Fla., USA) on dry matter base was added. Incubation time varied depending on the scale from 2 to 15 hours.

In order to filter the hydrolyzed starch sugars, the reacted slurry was diluted with about the same amount of demi water at 60° C. before pumping to the leaf filtration unit at a rate between 250 to 300 L/h. Filtration was continued till the pressure was 12 bar. The last step in the filtration operation was the supply of pressured air of 5 to 6 bar to the filter press to dry the cake until no more filtrate left the press.

The gluten cake of about 40% dry solids was dried on either a fluid bed dryer or a ring dryer till about over 90% of dry solids. With the fluid bed dryer operated at 70° C. of drying air some coarser product was obtained. The ring dryer feeding rate was adjusted manually to obtain a powder of about 90% of dry solids.

Ten different batches of corn gluten concentrates were made and the analytical composition is summarized in Table 3-2.

TABLE 3-2

Results of analytical composition of different batches of bleached corn gluten concentrate.

| Batch | Dry solids (%) | Protein (% db) | Starch (% db) | Crude lipids (% db) | Xanthophylls (ppm) |
|---|---|---|---|---|---|
| CWM 1-1 | 95.3 | 75.3 | 0.1 | 10.1 | 154 |
| CWM 1-2 | 95.1 | 77.5 | 0.2 | 9.9 | 155 |
| CWM 1-3 | 96.7 | 77.6 | <0.5 | 10.0 | 130 |
| CWM 1-4 | 94.3 | 75.3 | 0.8 | 10.0 | 152 |
| CWM 1-5 | 93.6 | 75.0 | 0.8 | 9.5 | 147 |
| Average 1-5 | 95.0 | 76.1 | 0.4 | 9.9 | 148 |
| CWM 2-6 | 93.6 | 80.0 | 0.2 | 10.1 | 163 |
| CWM 2-7 | 91.1 | 76.7 | 0.8 | 10.6 | 159 |
| CWM 2-8 | 93.6 | 81.5 | 0.4 | 10.1 | 206 |
| CWM 2-9 | 95.4 | 79.2 | 0.1 | 10.3 | 127 |
| CWM 2-10 | 94.3 | 77.1 | 0.8 | 10.6 | 118 |
| Average 6-10 | 93.6 | 78.9 | 0.5 | 10.3 | 155 |

Results/Discussion:

With lab scale degree of bleaching between 60 to 70% was obtained, the pilot plant trials resulted in products with about 5-35% of bleaching. Corn gluten concentrates bleaching according the pilot plant method resulted in xanthophylls levels of about 150 ppm.

Resulting products had protein levels above 75% on dry base and starch content below 0.5%. After de-starching and due to addition of full fat soy flour, the lipid levels of the resulting corn gluten concentrates are clearly higher compared to the starting heavy gluten slurries.

Example 4. Coagulation Procedure

Experimental Procedures

Dewatered corn gluten cake (CG cake) and light steep water draw off (LSW) were collected from a European Cerestar corn wet milling facility. Samples of these streams were mixed in a ratio of 1:3.85 (CG cake:LSW) (about 15 (m/m) % db) at a temperature of 50° C. with a residence time of 30 minutes. Dry solids of LSW and CG cake were measured.

Liquefaction was started after adjusted the pH to 5.8-6.2 using 10 (m/m) % NaOH. Termamyl™ (Novozymes A/S, DK-2880 Bagsvaerd, Denmark) was added to the mixture (0.1 (m/m) % on dry basis), the temperature was increased to 100° C. Once the temperature was above 93° C., the 15 minutes residence time started.

For saccharification the mixture was cooled to 60° C. and the pH was adjusted to 4.7 and 0.1 (m/m) % dry base of gluco-amylase Glucostar 300 L (Dyadic International Inc., Jupiter, Fla., USA) was added and the resulting mixture was incubated for 120 minutes.

Coagulation was accomplished by adjusting the pH of aliquots of the liquefied and saccharified slurry by using either 4M HCl or using a 10 (m/m) % sodium hydroxide solution to adjust the pH ranging from 4.5 to 6.0 in steps of 0.5 while stirring. Separation of the unsoluble fraction from the solubles was achieved by filtration on a Buchner funnel under vacuum using a Wattman 91 [Whatman PLC, Maidstone, Kent, UK] filter. Yields of filtrate and cake were determined and dry solids content was determined with an IR balance. A gluten cake with about 40% of dry solids was obtained. The protein content and amount of precipitate were determined. The filtrate was evaporated under vacuum (at least 30 mbar) on 40° C. in rotary evaporator. The cake of the wet corn gluten concentrate (~40% dry solids) is cut over a 1 mm sieve and dried in 20 minutes in a laboratory fluid bed drier on 80° C. maximum.

The resulting products were analyzed and the results of the coagulation experiments were summarized in Table 4-1.

TABLE 4-1

Results of coagulation experiments

| pH Coagulation | Dry base yield (%) (Col 1) | Soluble Protein ((m/m) % db) (Col 2) | Insoluble Protein ((m/m) % db) (Col 3) | Total Protein (m/m) % db (Col 4) | (Col 1) * (Col 3) % |
|---|---|---|---|---|---|
| 4.5 | 88.7 | 13.9 | 55.6 | 69.5 | 49.3 |
| 5.0 | 87.0 | 7.3 | 61.6 | 68.9 | 53.6 |
| 5.5 | 87.7 | 7.4 | 62.9 | 70.3 | 55.2 |
| 6.0 | 90.0 | 15.7 | 51.5 | 67.2 | 46.3 |

Results/Discussion:

It is clear that at pH between 5 to 5.5 yields are higher compared to 4.5 or 6.0.

Example 5. Gluten Cake Re-Suspended with Corn Gluten Dewatering Filtrate or Light Steepwater Liquefied and Saccharified Experimental Procedures:

Dewatered corn gluten cake (CG cake), corn gluten dewatering filtrate (CG filtrate), and light steepwater (LSW) were collected from a North American Cargill, Inc. wet milling facility. The proximate composition of the three mill streams is listed in Table 5-1.

TABLE 5-1

Proximate composition of mill streams used.

| Mill Stream | Dry solids (%) | Protein (% db) | Sugars (% db) |
|---|---|---|---|
| CG cake | 38.9 | 70.9 | 9.0 |
| CG filtrate | 2.3 | 65.8 | 15.1 |
| LSW | 8.2 | 43.8 | 23.0 |

Three different mixtures of CG cake were made with water, CG filtrate, or LSW. Three different mixtures of cake and liquid were made by combining 693 grams cake with either: 1) 1340 grams of water, 2) 1449 grams of LSW, or 3) 1372 grams of CG filtrate. To each of the three mixtures an amount of 16% (w/w) sodium hydroxide was added to adjust the pH of the mixture to 5.6. To each mixture, alpha-amylase (Fred L from Genencor, Beloit, Wis., USA) was then added at an amount of 0.065% (w/w) per dry solids of the mixture and mixed into the mixtures. Each mixture was then placed in a separate 4-liter plastic jar and incubated in a 90° C. water bath for 3 hours. Each jar was mixed approximately every 15 minutes by shaking. After the 3 hours of incubation were complete, each of the 3 jars was cooled to 60° C. in a cold water bath and a sufficient amount of 11% sulfuric acid was added to each mixture to adjust the pH to 4.3. To each mixture, Optimax 4060 VHP glucoamylase (Genencor, Beloit, Wis., USA) was added at an amount of 0.065% (w/w)

per dry solids content to each mixture. Each mixture was then placed in a shaking incubator at 60° C. for a period of 40 hours. After the 40 hours of incubation, each jar of each mixture was cooled to 30° C. in a cold water bath. Therein, each mixture was vacuum filtered using a Whatman #3 paper (Whatman, Clifton, N.J., USA) sufficient to produce a cake of approximately 35% dry solids and the filtrate was collected. An amount of water approximately equal to the cake mass was added on the surface of the cake as it became visually dewatered.

Each of the obtained cakes were dried in a 103° C. air oven. The particle size of the cake was reduced by grinding in a coffee grinder and protein content was determined. The sugar content of the mill streams and the collected filtrate from the three mixtures was determined.

TABLE 5-2

Results of Products Obtained

| Product | Mixture | % Protein (db) | % Sugars (db) |
|---|---|---|---|
| Cake | CG cake + distilled water | 85.45 | — |
| Filtrate | CG cake + distilled water | 15.8 | 76.8 |
| Cake | CG cake + CG filtrate | 86.7 | — |
| Filtrate | CG cake + CG filtrate | 23.5 | 63.5 |
| Cake | CG cake + LSW | 84.7 | — |
| Filtrate | CG cake + LSW | 40.3 | 33.3 |

Results/Discussion:

From comparing the composition of the initial millstreams presented in Table 5-1 and the composition of the final products obtained from each of the initial three mixtures presented in Table 5-2, it is apparent that the protein content of the corn gluten cake was increased from about 70.9% (db) to about 85.5% (db) for the water mixture, to about 86.7% (db) for the CG filtrate mixture, and to about 84.7% (db) for the LSW mixture. Additionally, the sugar content of the CG filtrate liquid stream was increased from about 15.1% (db) to about 63.5% (db), and the sugar content of the LSW filtrate stream was increased from about 23.0% (db) to about 33.3% (db). From this data it is apparent that this invention can be used to increase the protein content of CG cake while also increasing the sugar content of another water or mill stream mixed with and then later separated from the CG cake.

Example 6. Liquefaction of Clarifier Centrifuge Underflow with Various Mill Streams Experimental Procedures:

Clarifier centrifuge underflow (ClrUF), gluten thickener centrifuge overflow (GTOF), corn gluten dewatering filtrate (CG filtrate), and light steepwater draw off (LSW) was collected from a North American Cargill, Inc. wet milling facility. The ClrUF was dewatered and formed into a cake of 29.8% solids by vacuum filtering over a Whatman #3 filter paper. The proximate composition of the ClrUF cake and the other three mill streams is listed in Table 6-1.

TABLE 6-1

Proximate composition of mill streams used.

| Mill Stream | Dry solids (%) | Protein (% db) | Sugars (% db) |
|---|---|---|---|
| ClrUF cake | 29.8 | 6.6 | 10.5 |
| GTOF | 2.4 | 60.1 | 25.4 |
| CG filtrate | 2.3 | 65.8 | 15.1 |
| LSW | 8.2 | 43.8 | 23.0 |

A mixture of ClrUF cake and GTOF was made by mixing an amount of 1131 grams cake with 1500 grams of GTOF. The ClrUF cake and GTOF mixture was adjust to pH 5.60 by adding 7.73 g of 16% (w/w) sodium hydroxide. To the mixture, an amount of 360 microliters of Fred L alpha-amylase (Genencor, Beloit, Wis., USA) was then added and mixed into the mixture. The mixture was then placed in a 4 liter plastic jar and incubated in a 90° C. waterbath for 2 hours. A mixing impeller was submerged into the mixture within the jar, connected to a variable speed drive, and rotated at approximately 200 rpm. After the 2 hours of incubation were complete, the jar was cooled to 30° C. in a cold water bath. Therein, the mixture was vacuum filtered over a Whatman #3 paper, Whatman, Clifton, N.J., USA, sufficient to produce a cake of approximately 30% dry solids and the filtrate was collected. Five different cakes where produced. The first cake was vacuumed filtered only and filtrate was collected without wash water addition. The second cake was similarly filtered and then washed with an amount of water approximately equal mass to the cake mass was added on the surface of the cake as it became visually void of liquid water. The third, fourth, and fifth millstreams were similarly filtered and washed with GTOF, CG filtrate, and LSW, respectively.

Each of the obtained cakes were placed dried in an 103° C. air oven. The particle size of the cake was reduced by grinding in a in a coffee grinder and protein content was determined The sugar content of the millstreams and the collected filtrate was measured.

TABLE 6-2

Results of Products Obtained

| Product | Millstream Used for Wash | % Protein (db) | % Sugars (db) |
|---|---|---|---|
| Cake | None added | 41.4 | — |
| Filtrate | None added | 5.2 | 68.3 |
| Cake | distilled water (control) | 63.9 | — |
| Cake | GTOF | 60.6 | — |
| Filtrate | GTOF | 5.7 | 25.8 |
| Cake | CG filtrate | 59.6 | — |
| Filtrate | CG filtrate | 3.7 | 25.3 |
| Cake | LSW | 60.4 | — |
| Filtrate | LSW | 6.9 | 33.6 |

Results/Discussion:

From comparing the composition of the initial millstreams presented in Table 6-1 and the composition of the final products obtained as presented in Table 6-2, it is apparent that the protein content of the ClrUF cake was increased during practice of the invention from about 6.6% (db) to about 41.4% (db) with practice of the invention and when a washing step was not performed, and to about 63.9% (db) when wash water at an about an equal mass as the mass of the cake was added to the cake during filtering. When millstreams were used to wash the cake, the protein content of the cake was increased to about 60.6% (db) with the GTOF wash, to about 59.6% (db) with the CG filtrate wash, and to about 60.4% (db) with the LSW wash. Additionally, the sugar content of the GTOF which was captured as liquid stream/filtrate stream from the invention was increased from about 25.4% (db) to about 68.3% (db) without any wash. The protein content of the filtrate also varied with the use of different mill streams used for washing. From this data it is apparent that this invention can be used to increase the protein content of the ClrUF mill stream while also increasing the sugar content of another mill stream mixed with and then later separated from the ClrUF cake, with or without the addition of another millstream or same used for washing the concentrated protein cake. The final sugar content of the filtrate from the process can be raised or lowered by the sugar content of the wash stream. Use of water for washing did not introduce other solubles into the filtrate thus preserving the sugar content of the stream. However, when GTOF or CG Filtrate with a lower sugar content (% db) were used, the final sugar content of the filtrate was reduced.

The wash stream used for washing the cake influenced the final protein content of the cake. It is obvious from Table 6-2 that a washing step increases the final protein of the cake as no washing step produced a cake with only 41.4% protein, but use of any of the other streams produced a cake of approximately 60% protein or greater. Water, which has no non-protein solubles, produced the highest protein cake of 63.9% (db). Other streams, which contain solubles other than protein, produced lower protein cakes (59.6-60.6% db protein). These results show that the final protein content of the produced cake can be controlled by the protein content and non-protein dry matter content of the liquid used to wash the cake.

Example 7. Saccharification of Filtrate from a Liquefied Sample

Experimental Procedures:

The filtrate obtained from example 6 after filtering and without washing was further saccharified. To the filtrate a sufficient amount of 11% sulfuric acid was added to adjust the pH to 4.3. An amount 0.065% (w/w) per dry solids content of the filtrate of Optimax 4060VHP glucoamylase, Genencor, Beloit, Wis., USA, was added to the filtrate. The filtrate was then placed in a shaking incubator at 60° C. for a period of 40 hours.

The sugar content of the millstreams and the collected filtrate were measured.

TABLE 7-1

Sugar Content of Filtrate before and after Saccharification

| Mill Stream | Sugar (% db) |
|---|---|
| Initial | 68.3 |
| Saccharified | 91.5 |

Results/Discussion:

Saccharification with glucoamylase increased the concentration of sugar in the filtrate from about 68.3% (db) to about 91.5% (db), measured as the sum of glucose, fructose, maltose, and maltotriose Table 7-1. Thus indicating that larger chained carbohydrates can be isolated from a mill stream containing gluten by only liquifying and filtering away the gluten protein. These carbohydrates were then more fully hydrolyzed to smaller sugars measured by the HPLC using a saccharification step after separation from the gluten protein.

Example 8. Growth of *Saccharomyces Cerevisiae* on Filtrate

Experimental Procedures:

One milliliter of a 24 hour *Saccharomyces cerevisiae* culture was inoculated into basal media containing 5 g/L peptone and 3 g/L yeast extract and 16 (Glucose A) or 50 g/L (Glucose B) of D-glucose (Sigma-Aldrich Co., St. Louis, Mo.) or prototype mill stream product added to generate starting glucose concentrations of 25 (Experimental A) or 45 g/L (Experimental B). The prototype product examined was the saccharified filtrate resulting from Example 7. Cultures were incubated at 30 (C with 100 rpm shaking. Samples were taken after 0, 18 and 44 h and optical density at 595 nm was measured. Organic acid and ethanol profiles were quantitated by HPLC using an Aminex HPX-87H ion exclusion column (Bio-Rad, Hercules, Calif.) with a 0.01N sulfuric acid mobile phase.

TABLE 8-1

Optical Density and Ethanol yield of Fermented Glucose Control and Filtrate.

| | O.D. 595 - T18 | % Ethanol yield - T44 |
|---|---|---|
| Glucose A | 14.82 | 43.22 |
| Glucose B | 14.88 | 44.42 |
| Experimental A | 18.33 | 45.72 |
| Experimental B | 15.72 | 44.49 |

Optical density measured at 595 nm after 18 hours and ethanol yield after 44 h of *S. cerevisiae* growth. The Glucose A culture contained 17 g/L glucose and the Glucose B culture contained 50 g/L glucose in the basal peptone and yeast extract media. The Experimental cultures contained basal medium plus the prototype material normalized to 25 g/L (A) and 45 g/L glucose (B).

Results/Discussion:

Experiments were set up to examine fermentability of the prototype millstream product. Fermentability in this study was defined as capability of the feedstock to support growth of *S. cerevisiae* and sustain product formation, in this case ethanol. The prototype material, as indicated by optical density measurements in Table 5-1, supported cell growth. In addition, dextrose was fully utilized in all cultures after 44 h, indicating fermentation occurred. Ethanol yields on the prototype material were between 44 and 46%, which is near 90% of the maximum theoretical yield (50%). Thus, the prototype material was capable of supporting *S. cerevisiae* growth and ethanol production.

The prototype product, a filtrate resulting from liquified and saccharified clarifier underflow cake resuspended with gluten thickener overflow, was able to support *S. cerevisiae* growth and ethanol production at different starting glucose concentrations.

Example 9. Gluten Cake Re-Slurried with Saccharified Filtrate and Sample Liquefied and Saccharified Dewatered corn gluten cake (CG cake), same as used in Example 5, was collected from a North American Cargill, Inc. wet milling facility. The cake was mixed with the saccharified filtrate without washwater addition (sacc'd filtrate) produced in Example 7. The proximate composition of the CG cake and sacc'd filtrate are listed in Table 9-1.

TABLE 9-1

Proximate composition of mill streams used.

| Mill Stream | Dry solids (%) | Protein (% db) | Sugars (% db) |
|---|---|---|---|
| CG cake | 38.9 | 70.9 | 9.0 |
| Sacc'd filtrate | 22.9 | 4.8 | 91.5 |

An amount of 100 grams CG cake was mixed with 250 grams of sacc'd filtrate produced in Example 7. To the mixture an amount of 16% (w/w) sodium hydroxide was added to adjust the pH of the mixture to 5.60. An amount of 40 micoliters of alpha-amylase (Fred L from Genencor, Beloit, Wis., USA) was then added and mixed into the mixture. The mixture was then placed in a 0.5 liter plastic jar and incubated in a 90° C. waterbath for 3 hours. A mixing impeller was submerged into the mixture within the jar, connected to a variable speed drive, and rotated at approximately 200 rpm. After the 2 hours of incubation were complete, the mixture was cooled to 60° C. in a cold water bath and a sufficient amount of 11% sulfuric acid was added to each mixture to adjust the pH to 4.30. An amount of 40 microliters of Optimax 4060VHP glucoamylase (Genencor, Beloit, Wis., USA) was added to the mixture. The mixture was then placed in a shaking incubator at 60° C. for a period of 40 hours. After the 40 hours of incubation, the mixture was cooled to 30° C. in a cold water bath. Therein, the mixture was vacuum filtered using a Whatman #3 paper (Whatman, Clifton, N.J., USA) sufficient to produce a cake of approximately 32% dry solids and the filtrate was collected. An amount of water approximately equal to the cake mass was added on the surface of the cake as it became visually dewatered.

The obtained cake was dried in a 103° C. air oven. The particle size of the cake was reduced by grinding in a in a coffee grinder and protein content was determined. The sugar content of the mill streams and the collected filtrate from the three mixtures was determined.

TABLE 9-2

Results of Products Obtained

| Product | % Protein (db) | % Sugars (db) |
|---|---|---|
| Cake | 84.4 | 10.9 |
| Filtrate | 4.9 | 93.3 |

Results/Discussion:

From comparing the composition of the initial millstreams presented in Table 9-1 and the composition of the final products obtained from each of the initial three mixtures presented in Table 9-2, it is apparent that the protein content of the corn gluten cake was increased from about 70.9% (db) to about 84.4% (db). Additionally, the sugar content of the sacc'd filtrate liquid stream was increased from about 91.5% (db) to about 93.3% (db). The sugar content of the filtrate was similar before and after addition of the washing step using water (data not shown), indicating that a high level of pure sugar is retained in the cake and that its removal can be manipulated with the amount of washing performed. From this data it is apparent that this invention can be used to increase the protein content of CG cake while also increasing the sugar content of another water or mill stream mixed with and then later separated from the CG cake. As presented in this example, this mill stream may be a recycled filtrate stream obtained from filtration of the final CG cake product.

Example 10. Treatment of Gluten with Mixtures of Carbohydrases and Further Contact with Solvents Gluten thickener underflow (GT u/f) and millstream thickener overflow (MST o/f) samples were collected from a Cargill, Inc. wet milling facility (USA). Partially dewatered gluten was prepared by high speed centrifuging GT u/f samples at 4000 rpm for 5 minutes in a laboratory centrifuge. An amount of 400 g of the partially dewatered gluten was then combined with 2267 g of MST o/f to create a gluten mixture. The gluten mixture was mixed in a Waring blender at full speed for 3 minutes. This mixture had a starting protein content of about 67%, dry basis (db). The gluten mixture was split into seven equal portions. Two portions of the gluten mixture were sieved over either a 325 mesh (45 micron opening) or a 200 mesh (75 micron opening) US standard sieves to remove components of low protein composition from the mixture; the filtrate was collected and used for further treatment with carbohydrases while the retentate (sieve overs) was discarded. The seven portions, including the 2 sieved filtrates were then pH adjusted and treated with carbohydrase(s), filtered, dried, and optionally defatted.

Each of the gluten mixtures was liquefied with alpha-amylase. To each portion of the gluten mixture a sufficient amount of 10% (w/w) sodium hydroxide was added to adjust the pH of the gluten to 6.0. An amount of 40 microliters of alpha-amylase (Fred L from Genencor, Beloit, Wis., USA) was then added and mixed by stirring each mixture. Each mixture placed in a 1 liter plastic jars and incubated in a 90° C. waterbath for 2 hours. A mixing impeller was submerged into each mixture within the jar, connected to a variable speed drive, and rotated at approximately 200 rpm. One mixture was cooled incubated for an additional 12 hrs as listed below (sample: Liquefy Only). Six of the Liquefied mixtures where then cooled and either further treated by saccharifying and/or treated with fiber degrading enzymes (hemicellulase).

The remaining six mixtures were cooled to 60° C. in a cold water bath and a sufficient amount of 11% sulfuric acid was added to each mixture to adjust the pH to 4.2. Five of the mixtures were saccharified by adding an amount of 40 microliters of Optimax 4060VHP glucoamylase (Genencor, Beloit, Wis., USA) and holding at elevated temperatures as described below. To the mixture not treated with the glucoamylase, 20 microliters of each of the fiber degrading enzymes of Spezyme CP, Xylanase 729, and Phytase GC491 (Genencor, Beloit, Wis., USA) were added (sample: Liquefy and hemicellulase and phytase). The mixtures were then placed in a waterbath at 60° C. for 2 hrs. After 1 hour, 1 of the mixtures originally treated with the glucoamylase was additionally treated with the fiber degrading enzymes mixture as listed above (Liquefy then sacc and hemicellulase and phytase). One mixture treated with glucoamylase was cooled and filtered as below (Liquefy and sacc (2 hr)). The other five mixtures and the sixth mixture originally only liquefied were then held at 45° C. for 10 additional hours.

After carbohydrase treatments, all the mixtures treated with carbohydrases and optionally phytase were vacuum filtered at 45° C. using a Whatman #3 paper (Whatman, Clifton, N.J., USA) sufficient to produce a cake of approximately 30-35% dry solids and the filtrate was collected. An amount of water approximately equal to the cake mass was added on the surface of the cake as it became visually dewatered.

The obtained cake was dried in a 103° C. air. The particle size of the cake was reduced by grinding in a in a coffee grinder.

Samples were defatted by contacting the samples' cakes with either hexane (Defat#1) or with petroleum ether (Defat#2). Samples were submersed in excess solvent for a period of 2 hrs at ambient temperature in 50 ml tubes that were rotated (tumbled). Solvent was filtered from the samples by vacuum over a glass fiber filter. Retained sample was air oven dried at 103° C. for 10 hrs. Protein contents were measured as below. Petroleum ether treatment further bleached the samples and resulted in a lighter color protein product. Protein contents resulting from defatting treatments after carbohydrase treatments are shown in Table 10-1.

Protein content of the dried cakes were measured before and after defatting.

TABLE 10.1

Protein Content of a mixture of GT u/f and MST o/f after Carbohydrase Treatments and optionally Sieving and Defatting.

| Carbohydrase Treatment | Protein after Carbohydrase Treatment (% db) | Protein after treatment and Defat#1 (% db) (difference$^a$) | Protein after treatment and Defat#2 (% db) (difference$^a$) |
|---|---|---|---|
| Liquefy (14 hr) | 87.80 | — | — |
| Liquefy and hemicellulase and phytase | 88.92 | 91.34 (2.42) | 91.52 (2.6) |
| Liquefy and sacc (2 hr) | 86.47 | 90.83 (4.36) | 91.34 (4.87) |
| Liquefy and sacc (12 hr) | 88.47 | 91.73 (3.26) | 91.93 (3.46) |
| #200 wire sieve throughs, liquefy and sacc | 88.44 | 90.99 (2.55) | 91.79 (3.35) |
| #325 wire sieve throughs, liquefy and sacc | 89.18 | 91.86 (2.68) | 93.09 (3.91) |
| Liquefy then sacc and hemicellulase and phytase | 88.93 | 92.00 (3.07) | 92.48 (3.55) |

Difference between protein content of filtered and dried gluten after carbohydrase treatment (with or without phytase inclusion) (column 2) and after solvent treatment (column 3:Defat#1 or column4:Defat#2) is listed in parenthesis in each column.

Results/Discussion:

From comparing the original composition of the initial gluten mixture to the protein contents of the mixtures after practice of the invention as presented in Table 10-1, it is apparent that the protein content of the gluten mixture was increased from about 67% (db) to at least about 86.47% (db) with carbohydrase treatment and up to about 93.09% (db) with sieving and further defatting.

Liquefying the gluten mixture increased the protein content from about 67% (db) to about 87.80% (db). Addition of hemicellulases and phytases in addition to liquefaction increased protein content to about 88.92% (db). Saccharifying the liquefied sample for 12 hr increased protein to about 88.47% (db). The protein content of the 2 hr liquefaction with a 2 hr saccharification treatment did not equal a 14 hr liquefaction treatment, but the 86.47% (db) protein was substantially greater than the 67% protein content starting gluten mixture. Longer saccharification times increased protein content. Liquefying, saccharifying, then treatment with hemicellulases and phytase resulted in about 88.93% (db) protein.

Sieving the gluten mixture over a #325 wire US sieve prior to liquefying and saccharifying increased the protein content to about 89.18% (db). Defatting the carbohydrase (phytase) treated gluten with hexane or petroleum ether always resulted in an increase in the protein content above and beyond the carbohydrased treated gluten's protein content on an average of about 3.06% and about 3.62% higher protein content for Defat#1 and Defat#2, respectively.

From this data it is apparent that this invention can be used to increase the protein content of a mixture of GT u/f and MST o/f. The protein content can be further increased after treatment with carbohydrases by contact of the product with a solvent. The type of solvent has an impact on the final protein product. Sieving the gluten mixture also increased protein content.

Example 11. Gluten Cake Slurried with Liquefied Starch, Liquefied and Filtered at Various Temperatures Dewatered corn gluten cake (CG cake) was collected from a European Cerestar, Inc. wet milling facility. An amount of 58 kg CG cake of 40% dry solids was mixed with 98 kg of liquefied starch (32.3% dry solids) to create a gluten-mixture.

The liquefied starch had been previously prepared by mixing corn starch produced from a European Cerestar, wet milling facility with a sufficient amount of water to create a 32.3% dry solids concentration, adding 150 PPM calcium chloride, adjusting pH to 5.6 with 10% sodium hydroxide, adding 0.1% alpha-amylase (Fred L from Genencor, Beloit, Wis., USA), and then heating to 95° C. and holding for 4 hours.

The gluten-mixture was blended with a blending type mixer. The gluten-mixture was liquefied by adding an amount of 16% (w/w) sodium hydroxide to adjust the pH of the mixture to 5.6 and then adding an amount of 42 g of alpha-amylase (Fred L from Genencor, Beloit, Wis., USA) that was mixed into the mixture. The gluten mixture was further mixed using a high-speed centrifugal pump that pumped the mixture through a heat exchanger to heat the gluten mixture to 95° C. The mixture was then placed in a 600 L stirred tank vessel to which 42 g more alpha-amylase was added. The mixture was incubated with stirring at 90-95° C. for about 3.5 hours.

After liquefaction, the mixture was transferred to a rotary drum vacuum filter fitted with Komline Sanderson KS-201 cloth (Komline-Sanderson Engineering Corporation, Peapack, N.J., USA) operating at 73 meters/hour linear cloth speed. The gluten mixture was filtered at the incubating temperature of 90° C. in one trial. In a second trial the gluten mixture was cooled to 20° C. using a tube-in-shell heat exchanger (water used for heat absorption) before filtering. A concentrated protein cake was formed and discharged from the cloth. Cake moisture and protein results are shown in Table 11-1.

The cake discharged from the drum filter was dried in a 103° C. air oven and dry solids were measured. The particle size of the cake was reduced by grinding in a coffee grinder and protein content was determined.

TABLE 11-1

Results of Concentrated Protein Cake Obtained using Different Filtration Temperatures

| Filtration Temperature (° C.) | Cake Dry Solids (%) | % Cake Protein (db) |
|---|---|---|
| 20 | 31.1 | 70.6 |
| 90 | 32.4 | 66.8 |

Results/Discussion:

The gluten mixture was successfully filtered at either 20° C. and at liquefaction temperature (90° C.) to produce a protein product. Filtering the liquefied gluten mixture at high temperatures, such as 90° C. or at 45° C. and above, provides the benefit of inhibiting microbial growth and energy savings for heat exchanging and drying. Corn gluten is typically filtered at temperatures less than 40° C. This protein product was unexpectedly filterable at higher temperatures.

Example 12. Increasing Protein Content with Multiple Filtration and Washing Steps The dewatered concentrated protein cake produced in example 11 was collected as it discharged from the drum filter. About 500 g cake was suspended in 1000 g water by mixed with an impeller that was submerged into the mixture, connected to a variable speed drive, and rotated at approximately 1000 rpm. The suspended cake and water mixture was transferred to and vacuum filtered using a Whatman #3 paper (Whatman, Clifton, N.J., USA) sufficient to produce a cake of approximately 38% dry solids filtered using a vacuum filter, and washed with surface application of about 200 g water. The obtained cake was dried in a 103° C. air oven. The particle size of sub-samples of the cake was reduced by grinding in a coffee grinder and protein content was determined Results are presented in Table 12-1:

TABLE 12-1

Results of Products Obtained before and after Washing

| Product | % Protein (db) |
| --- | --- |
| Filtered Cake from Example 11 | 70.6 |
| Washed Protein Material | 83.4 |

Results/Discussion:

It is evident that a quantity of non-protein containing material resided in the concentrated protein cake after the first drum filtration step. This material could be removed with a second suspension in water and a washing and a higher, more concentrated protein product was produced. The protein content of the product can be manipulated by the amount and type of washing steps followed. Washing can be effectively performed by secondary washing steps involving the suspension in a liquid containing less sugar and higher sugar/oligosaccharide concentration than the concentrated protein cake contained.

Example 13. Gluten Cake Re-Slurried with Recycled (Reused) Filtrate and Sample Liquefied Dewatered corn gluten cake (CG cake) was collected from a European Cerestar, wet milling facility. An amount of 58 kg cake of about 40% dry solids was mixed with 98 kg of filtrate obtained from rotary drum filtering the liquefied protein concentrated cake from example 11. The cake and filtrate were mixed, liquefied, and filtered as in example 11 except that filtrate was used instead of starch liquefact. Additionally, the mixture was incubated at 90° C. for about 3.5 hours and filtered at 45° C. after cooling the liquefied mixture with the heat exchanger as described in Example 11. The obtained cake was dried in a 103° C. air oven. The particle size of the cake was reduced by grinding in a coffee grinder and protein content was determined.

TABLE 13-1

Results of Products Obtained before and after Washing

| Product | Cake Dry Solids (%) | % Protein (db) |
| --- | --- | --- |
| CG cake | 38.0 | 67.8 |
| Liquefied and filtered cake | 32.3 | 73.7 |

Results and Discussion:

From this data it is apparent that this invention can be used to increase the protein content of CG cake and to produce a concentrated protein product. As presented in this example, this millstream may be a recycled filtrate stream obtained from filtration of the liquefied protein produced in a previous run or trial. This process can be integrated to be a continuous recycling of filtrate from the drum or other filtering or other separating unit to suspend or mix with the gluten cake entering the process.

Example 14. Control of Sugars in Protein Product

Dewatered corn gluten cake (CG cake) was collected from a North American Cargill, Inc. wet milling facility. The cake of 40% dry solids and approximately 70% protein was suspended into a mixture with either water or a mixture of liquefied starch and water. The liquefied starch was made as in Example 11. To create a mixture of cake and water (cake+water), an amount of 58 kg cake was added to 98 kg water. To create a mixture of cake and starch liquefact (cake+starch liquefact), an amount of about 62 kg of cake was added to 41 kg of 32% ds liquefied starch and 47 kg of water. The cake and water or filtrate and water were mixed, liquefied, and filtered as described in Example 11, except that the mixture was incubated at 90-95° C. for about 10 hours and filtered at 48-50° C. after cooling with the heat exchanger as described in Example 11.

Dewater cake discharged from the drum filter was dried in a 103° C. air oven. The particle size of the cake was reduced by grinding the cake in a coffee grinder and protein content was determined. The protein content, ash content, and lipid content was measured, and is presented in Table 14-1.

TABLE 14-1

Proximate composition of protein product

| % Composition | Cake + Water | Cake + Starch Liquefact |
| --- | --- | --- |
| Protein | 83.8 | 72.5 |
| Ash | 1.8 | 1.4 |
| Lipid | 4.5 | 3.4 |

The water extractable solids (residuals) in the cake were measured by placing 10 g of dried cake finely ground with a coffee grinder into 50 ml tubes with 40 ml of distilled water and tumbling/mixing with rotation for 1 hr. The tubes were then centrifuged at 4000 rpm for 5 min and the supernatant was tested for suspended extractable sugars and higher sugars/oligosaccharide and similar residuals of liquefied starch.

Sugar DP profile (water extractable carbohydrate) was determined and quantified. The sum of the peak areas of peaks indicating degree of glucose polymerization (DP) 1-13 were summed (total area 1-13). Similarly, the sum of the peak area of peaks indicating degree of glucose polymerzation (DP) 1-4 were summed (total 1-4) and the sum of the peak area of peaks indicating degree of glucose polymerization DP 5-13 were summed (total 5-13). The values reported below in Table 14-2 reflect relative percent of total area of total 1-4, and total 5-13.

TABLE 14-2

Sugar profile of water extractable residuals in cake

| Composition of Water Extractable Sugars, Higher Sugars, and Oligosaccharides as summed area % of peaks DP 1-13 | Cake + Water | Cake + Starch Liquefact |
|---|---|---|
| DP 1-4 (total 1-4/total area 1-13) | 30.8% | 45.3% |
| DP 5-13 (total 5-13/total area 1-13) | 69.2% | 54.7% |

Results/Discussion:

The protein content of the gluten cake millstream was raised from 70% (db) protein to 72.5 or 83.8% (db) concentrated protein with practice of the invention. The concentrated protein cake produced from the liquefied and filtered gluten mixture contained a mixture of water extractable residual sugars and higher sugars/oligosaccharides that were below 13 dp. These sugars and higher sugars and oligosccharides were primarily remnants of the starch liquefaction process that remained in the cake after filtrations. The lower protein cake produced from the Cake+Starch Liquefact contained a higher proportion 1-4 DP sugars as compared to 5-13 DP higher sugars/oligosaccharides residing within the cake that were extractable with water. In comparison, the protein concentrate made from a mixture of gluten cake and water contained an even higher proportion of extractables with DP 5-13. It is apparent that the protein content of the cake produced was dependent on the concentration of carbohydrates in the mixture prior to liquefaction, and thus the protein content of the final product could be manipulated by the concentration of sugars and higher sugars in the mixture prior to filtration.

What is claimed is:

1. A corn protein concentrate comprising:
    a) corn protein, wherein the corn protein is present in the corn protein concentrate in an amount of greater than 70% corn protein on a dry basis; and
    b) sugars of degree of glucose polymerization 1-13 and having glucose units attached by alpha-glycosidic linkages, wherein at least 10% of the sugars of degree of glucose polymerization 1-13 (total area 1-13) are sugars of degree of glucose polymerization 5-13 (total 5-13).

2. The corn protein concentrate according to claim 1, wherein the corn protein concentrate does not include exogenous saccharification enzymes.

3. The corn protein concentrate according to claim 2 wherein the saccharification enzymes are derived from microorganisms.

4. The corn protein concentrate according to claim 2, wherein the saccharification enzymes are selected from the group consisting of glucoamylases, pullulanases, and mixtures thereof.

5. The corn protein concentrate according to claim 3, wherein the microorganisms are selected from the group consisting of fungi, bacteria, and mixtures thereof.

6. The corn protein concentrate according to claim 1, wherein at least 20% of the sugars of degree of glucose polymerization 1-13 (total area 1-13) are sugars of degree of glucose polymerization 5-13 (total 5-13.

7. The corn protein concentrate according to claim 1, wherein at least 30% of the sugars of degree of glucose polymerization 1-13 (total area 1-13) are sugars of degree of glucose polymerization 5-13 (total 5-13).

8. The corn protein concentrate according to claim 1, wherein at least 35% of the sugars of degree of glucose polymerization 1-13 (total area 1-13) are sugars of degree of glucose polymerization 5-13 (total 5-13).

9. The corn protein concentrate according to claim 1, wherein at least 40% of the sugars of degree of glucose polymerization 1-13 (total area 1-13) are sugars of degree of glucose polymerization 5-13 (total 5-13).

10. The corn protein concentrate according to claim 1, wherein at least 55% of the sugars of degree of glucose polymerization 1-13 (total area 1-13) are sugars of degree of glucose polymerization 5-13 (total 5-13).

11. The corn protein concentrate according to claim 1, wherein the corn protein concentrate comprises at least 80% corn protein on a dry basis.

12. The corn protein concentrate according to claim 1, wherein the corn protein concentrate comprises at least 90% corn protein on a dry basis.

13. The corn protein concentrate according to claim 1, wherein the corn protein concentrate comprises at least 70% to 90% corn protein on a dry basis.

14. The corn protein concentrate according to claim 1, wherein the corn protein concentrate comprises at least 70% to 93% corn protein on a dry basis.

15. A corn protein concentrate comprising:
    a) corn protein, wherein the corn protein is present in the corn protein concentrate in an amount of at least 75% to 80% corn protein on a dry basis; and
    b) sugars of degree of glucose polymerization 1-13 and having glucose units attached by alpha-glycosidic linkages, wherein at least 10% of the sugars of degree of glucose polymerization 1-13 (total area 1-13) are sugars of degree of glucose polymerization 5-13 (total 5-13).

16. A corn protein concentrate produced by the process comprising:
    a) providing a grain steeped under conditions to form a steeped grain;
    b) separating starch from protein in the steeped grain to provide a protein fraction and a starch fraction;
    c) adding carbohydrase enzymes to the protein fraction to degrade starch and to obtain a corn protein concentrate, wherein the corn protein is present in the corn protein concentrate in an amount of at least 75% to 80% corn protein on a dry basis; and
    b) sugars of degree of glucose polymerization 1-13 and having glucose units attached by alpha-glycosidic linkages, wherein at least 10% of the sugars of degree of glucose polymerization 1-13 (total area 1-13) are sugars of degree of glucose polymerization 5-13 (total 5-13).

* * * * *

UNITED STATES PATENT AND TRADEMARK OFFICE
CERTIFICATE OF CORRECTION

PATENT NO. : 10,154,679 B2
APPLICATION NO. : 14/593504
DATED : December 18, 2018
INVENTOR(S) : Johannis Cornelis Slabbekoorn et al.

Page 1 of 1

It is certified that error appears in the above-identified patent and that said Letters Patent is hereby corrected as shown below:

In the Claims

In Column 24, Line 2, in Claim 6, delete "(total 5-13." and insert -- (total 5-13). --, therefor.

In Column 24, Line 52, in Claim 16, delete "b)" and insert -- d) --, therefor.

Signed and Sealed this
Second Day of April, 2019

Andrei Iancu
*Director of the United States Patent and Trademark Office*